US011453451B2

(12) United States Patent
Bogenschuetz et al.

(10) Patent No.: US 11,453,451 B2
(45) Date of Patent: Sep. 27, 2022

(54) BACKREST HAVING A HOLDER, SADDLE HAVING A BACKREST, AND DEVICE HAVING A SADDLE

(71) Applicants: Josef Bogenschuetz, Bisingen (DE); Andreas Tscheinig, Gratkorn (AT)

(72) Inventors: Josef Bogenschuetz, Bisingen (DE); Andreas Tscheinig, Gratkorn (AT)

( * ) Notice: Subject to any disclaimer, the term of this patent is extended or adjusted under 35 U.S.C. 154(b) by 138 days.

(21) Appl. No.: 16/760,604

(22) PCT Filed: Jun. 5, 2018

(86) PCT No.: PCT/DE2018/000170
§ 371 (c)(1),
(2) Date: Apr. 30, 2020

(87) PCT Pub. No.: WO2019/086059
PCT Pub. Date: May 9, 2019

(65) Prior Publication Data
US 2020/0255081 A1    Aug. 13, 2020

(30) Foreign Application Priority Data
Nov. 4, 2017    (AT) .............................. A 60121/2017

(51) Int. Cl.
*B62J 1/28*  (2006.01)
*B62J 1/00*  (2006.01)
*B62J 11/04* (2020.01)

(52) U.S. Cl.
CPC .................. *B62J 1/28* (2013.01); *B62J 1/007* (2013.01); *B62J 11/04* (2020.02)

(58) Field of Classification Search
CPC .................................... B62J 1/28; B62J 1/007
(Continued)

(56) References Cited

U.S. PATENT DOCUMENTS

| 1,113,833 A * | 10/1914 | Ruff ........................ A47C 7/443 |
| | | 297/301.4 |
| 4,313,639 A * | 2/1982 | Ware ........................ B60N 2/22 |
| | | 297/215.12 |

(Continued)

FOREIGN PATENT DOCUMENTS

| AT | 516 985 A2 | 10/2016 |
| BE | 403 805 A | 7/1934 |

(Continued)

OTHER PUBLICATIONS

International Search Report in PCT/DE2018/000170, dated Oct. 10, 2018.

*Primary Examiner* — Sarah B McPartlin
(74) *Attorney, Agent, or Firm* — Collard & Roe, P.C.

(57) ABSTRACT

The invention relates to a backrest for devices driven by means of pedals comprising a holder for fastening to the device and a contact surface for supporting a person operating the device, wherein the contact surface has a base body, on which at least one spherical segment-shaped contact surface, a roller segment-shaped contact surface arranged parallel to the pedals when in use, and/or a contact surface, which can be moved relative to the base body, is arranged.

Figure 1:
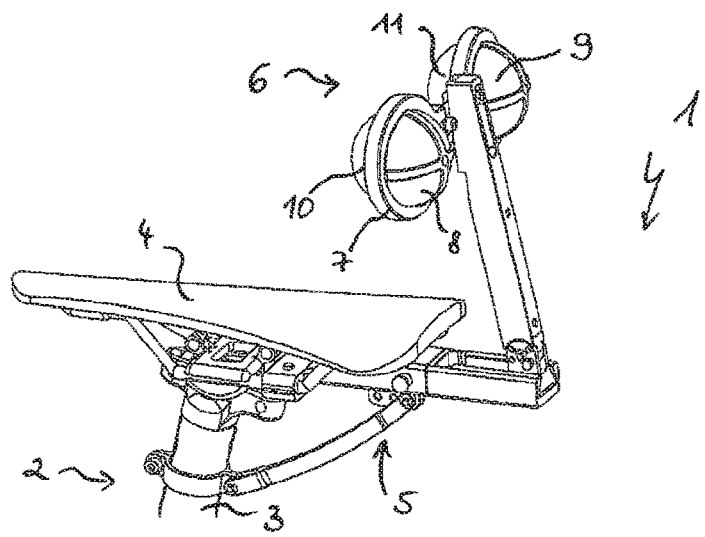

The invention furthermore relates to a saddle comprising a backrest, in the case of which the backrest is arranged in an articulated manner relative to the saddle, preferably so as to lock in place, in order to form an essentially horizontal saddle extension.

17 Claims, 5 Drawing Sheets

(58) Field of Classification Search
USPC .......................................... 297/215.1, 215.11
See application file for complete search history.

(56) References Cited

U.S. PATENT DOCUMENTS

| | | | |
|---|---|---|---|
| 4,466,660 A * | 8/1984 | Mabie .................. | B62J 1/28 |
| | | | 297/375 |
| 5,027,795 A * | 7/1991 | Kato .................... | B60N 2/976 |
| | | | 601/84 |
| 5,416,936 A | 5/1995 | Chan | |
| 5,887,943 A * | 3/1999 | Lee ..................... | B62J 1/28 |
| | | | 297/215.12 |
| 10,478,372 B1 * | 11/2019 | Rock .................... | A61H 1/00 |
| 2007/0249975 A1 | 10/2007 | Pan et al. | |
| 2014/0336550 A1 | 11/2014 | Zedaker | |
| 2015/0130944 A1 | 5/2015 | Hsu | |
| 2017/0029055 A1 * | 2/2017 | Chen ................... | E05B 67/003 |
| 2018/0368579 A1 * | 12/2018 | Schenck ............... | A47C 7/467 |

FOREIGN PATENT DOCUMENTS

| | | |
|---|---|---|
| CN | 2622050 Y | 6/2004 |
| CN | 203306183 U | 11/2013 |
| CN | 103879481 A | 6/2014 |
| CN | 204309934 U | 5/2015 |
| CN | 205524626 U | 8/2016 |
| CN | 106608330 A | 5/2017 |
| JP | 2011011607 A | 1/2011 |
| KR | 101040331 B1 | 6/2011 |

* cited by examiner

BACKREST HAVING A HOLDER, SADDLE HAVING A BACKREST, AND DEVICE HAVING A SADDLE

CROSS REFERENCE TO RELATED APPLICATIONS

This application is the National Stage of PCT/DE2018/000170 filed on Jun. 5, 2018, which claims priority under 35 U.S.C. § 119 of Austrian Application No. A 60121/2017 filed on Nov. 4, 2017, the disclosure of which is incorporated by reference. The international application under PCT article 21(2) was not published in English.

The invention relates to a backrest for devices driven by means of pedals comprising a holder for fastening to the device and a contact surface for supporting a person operating the device. The invention also relates to a saddle comprising a backrest and a device, in particular a bicycle, comprising a saddle comprising a backrest of this type.

A locking device for bicycles is known from AT 516985 A2, which has a slightly curved plate comprising a padded contact surface. This contact surface has a curved middle area and, on both sides thereof, edge areas formed more strongly. With a curved contact area, this saddle support is thus adapted to a lumbar area of a bicycle rider, so as to attain a contact, which is as comfortable as possible, on a large surface between the back and the backrest. The pressure applied by the bicycle rider on the backrest can thus be comfortably transferred, without having to expect pressure marks on the back of the bicycle rider.

Based on this prior art, the invention is based on the object of further developing a backrest of this type for the use for devices driven by means of pedals, such as, in particular, bicycles, spinning or indoor bikes or other vehicles driven by means of pedals.

This object is solved by means of a backrest comprising the features of patent claim 1.

The invention is based on the knowledge that a force transfer by means of a point or line area or even via a movable contact surface of a contact surface adapted to the surface of the back is to be preferred. The contact via a spherical or roller segment leads to a locally limited contact surface, which provides for a ventilation of the space between the back, the person driving the pedals, and the contact surface, and also has a massage function.

While a contact surface, which clings to the body shape, was proposed in the prior art—as in the case of an armchair—the solution according to the invention leads to a point-wise or linear contact pressure, which leads to a higher surface pressure than in the prior art. Fortunately, it has been found, however, that this surface pressure does not lead to hematomas, but provides for a particularly comfortable force transfer from the operator via the operator's back to the backrest, due to the ventilation and massage function, in particular in the field of sports.

The backrest can have an individual contact surface, which, in particular as movable contact surface, provides for a systematic force transfer. It is advantageous, however, when the backrest has at least two spaced-apart contact surfaces. This makes it possible, for example, to provide one or several contact surfaces each on both sides of the spine of a person operating the device. In particular in the case of roller segment-shaped contact surfaces, the latter can, however, also extend over the middle of the device or of the person operating the device.

The distance of the contact surfaces relative to one another can be fixed by the construction of the backrest. It is advantageous, however, when the distance of the contact surfaces can be set relative to one another and can be fixed in the set position.

Provided that at least two spaced-apart contact surfaces are provided, these contact surfaces can also be arranged on both sides of the holder. A symmetrical arrangement is thereby particularly advantageous for transferring the force via the contact surface to the holder.

The base body can be elastically fastened to the holder. However, an individual adaptation is attained in that the at least one contact surface is mounted elastically relative to the base body.

The at least one contact surface itself can furthermore also be formed to be elastic. This allows for a yielding of the contact surface, depending on stress. In the alternative, the contact surface can also be plastically deformable, so that it is only deformed in response to a change of the contact force.

It is particularly advantageous when, together, several contact surfaces are elastically mounted relative to the base body. This makes it possible to elastically form several contact surfaces with an elastic mounting.

To optimally position and to securely hold the base body in a suitable position relative to the holder, it is proposed that the base body has at least two lever arms, which are connected to one another so as to be capable of being set via a joint.

It is also advantageous when the base body has at least two lever arms and when the length of at least one of the lever arms can be set. The position of the contact surface relative to the holder can thus be set individually.

The base body can be fastened to the saddle post. It is advantageous, however, when, in the alternative or cumulatively thereto, the base body has a saddle fastening means for fastening to a saddle. This makes it possible to fasten the contact surface either to the saddle in a simple manner or preferably to the saddle and the saddle post via a two-point fastening.

The saddle fastening means preferably has a longitudinal extension, which cooperates with the saddle in such a way that it is held parallel to the saddle by means of the saddle. A rotational movement around the axis of a saddle post can be prevented thereby by means of stops of the saddle fastening means on the saddle. A further fastening to the saddle post makes it possible to avoid a rotation of the saddle fastening means around the axis of its longitudinal extension.

It is thus proposed that, as preferred embodiment variation, the base body has a saddle post fastening means for fastening to a saddle post.

A stable and dynamic fastening can be attained in that a connecting rod is connected in an articulated manner to the saddle fastening means and the saddle post fastening means.

When the backrest has several contact surfaces and a holder between these contact surfaces, a bottle, a box, a rack or a similar means can be fastened at a defined location by means of the holder.

A spherical or a roller segment is sufficient as contact surface. It is structurally advantageous, however, when at least one contact surface of the backrest is the surface of a sphere or of a roller.

The sphere or the roller or the contact surface thereof, respectively, can thereby be mounted so as to be movable around at least one axis. A horizontal or a vertical axis is advantageous, whereby different axis alignments may be advantageous, depending on shape and formation of the contact surface.

A movability around different axes is attained in that the contact surface or the body forming the contact surface, respectively, is mounted in a cage.

Further functions and advantageous design variations follow when the backrest has a saddle cover and/or a bicycle lock. The particular formation of the contact surface can thereby not only be formed for abutting against the back of the person operating the pedals, but also for the purpose of covering the top side of the saddle against rain. It is advantageous thereby when base body and contact surfaces cooperate in such a way that they are mounted in such a way that they can be used to cover the top side of a saddle It is particularly advantageous when the backrest has a bicycle light. This bicycle light can be an actively radiating electric light or a light reflector. The rearward surfaces of the contact surface or the body forming the contact surface, respectively, and the base body can thereby serve to fasten the bicycle light.

A further development provides that the backrest has a sender. This sender can transfer location data of the backrest to a receiver, in order to be able to determine the location of the device or at least of the backrest after a theft. Cumulatively or alternatively, however, data relating to a mechanical deformation or a pressure on the contact surface can also be acquired and sent, in order to be able to analyze the movement of the person operating the pedals.

A further development provides that the backrest has a sensor and a pressure cylinder for changing the position of the contact surface, in order to thus vary the contact pressure of the contact surface on the back of a user. This makes it possible to control or to regulate the contact pressure, in that pressure is exerted on the contact surface via the pressure cylinder, so that the position thereof is changed.

The object on which the invention is based is also solved by means of a saddle comprising a backrest of this type. The backrest can thereby be arranged in an articulated manner to the saddle, preferably so as to lock in place. This provides for an essentially horizontal saddle extension. A person sitting on the saddle can thus slide rearwards onto the saddle extension, in particular when riding up steep hills. However, the saddle extension can also be formed to be so stable that a second person can sit there or that the saddle extension can be used like a rack.

Lastly, the object on which the invention is based is also solved by means of a device, such as in particular a bicycle comprising a saddle and a backrest of this type.

Figure 2:
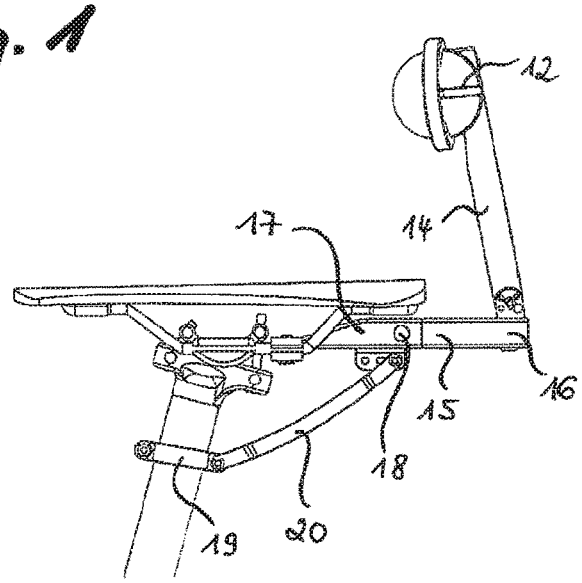
Figure 3:
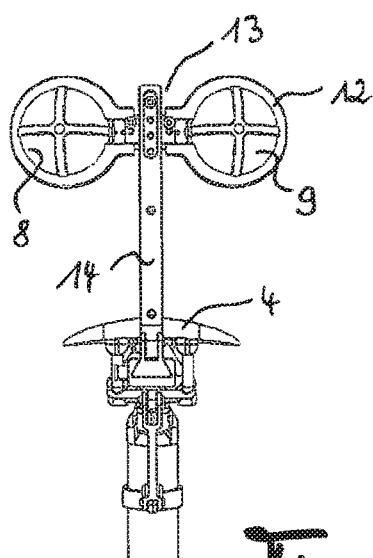
Figure 4:
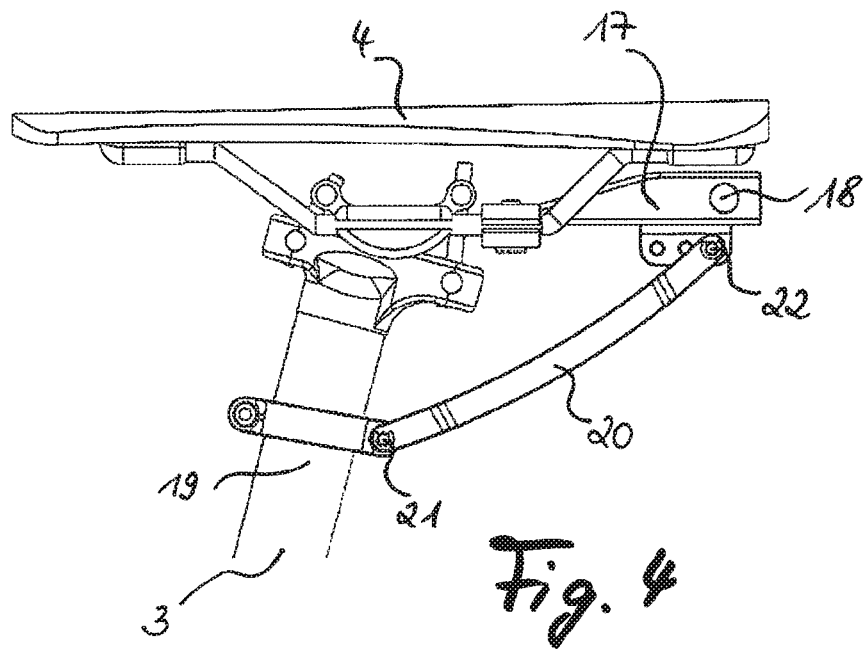
Figure 5:
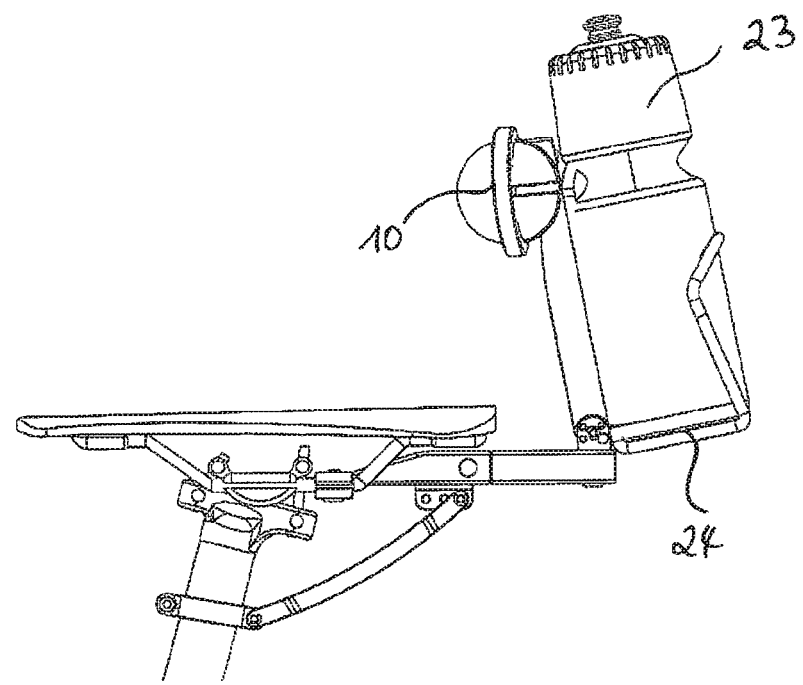
Figure 6:
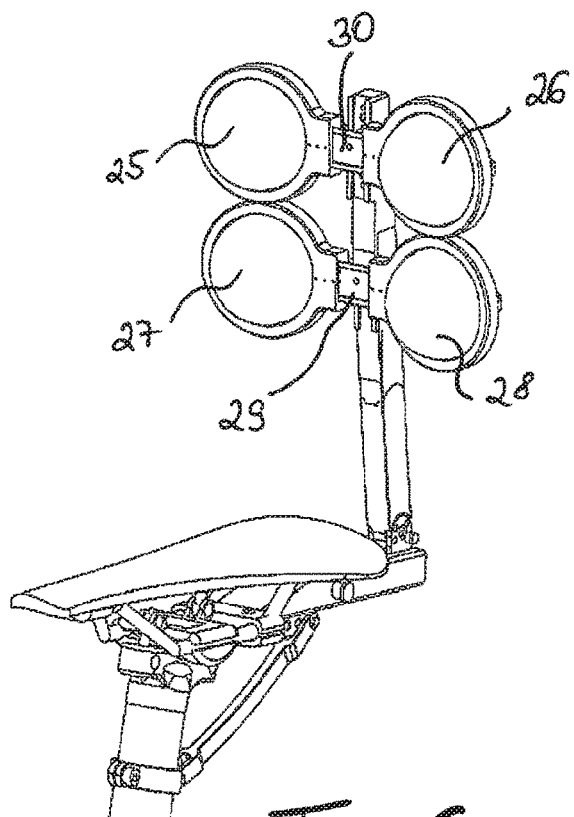
Figure 7:
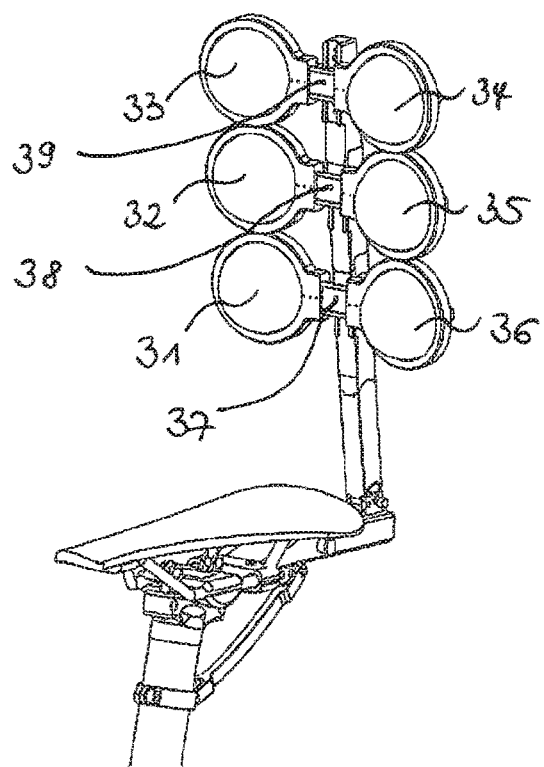
Figure 8:
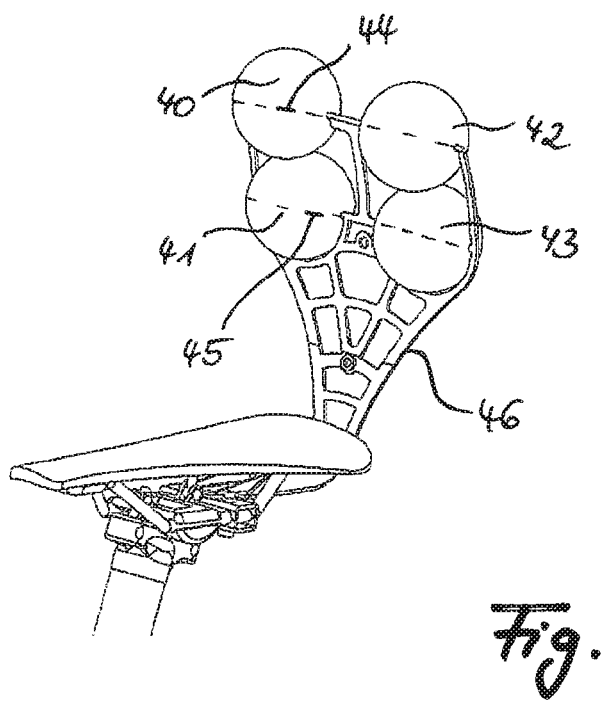
Figure 9:
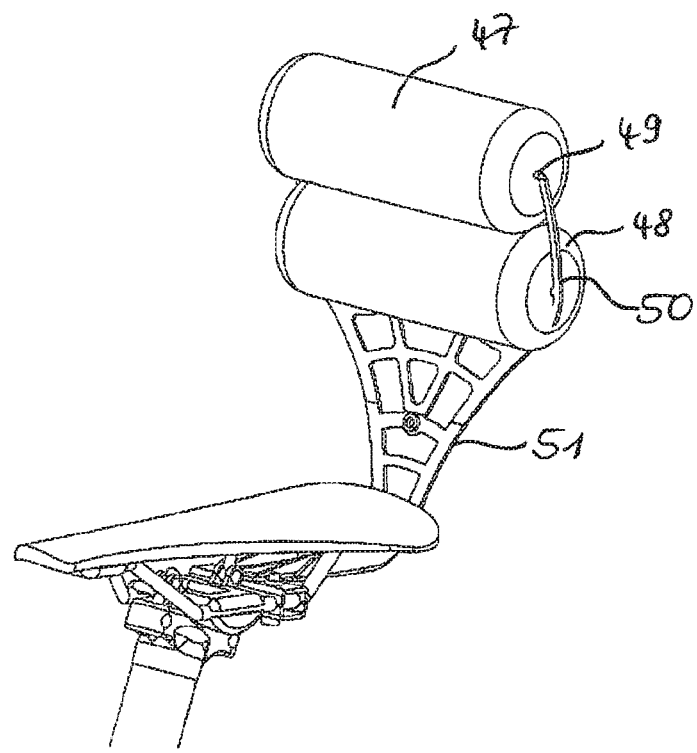
Figure 10:
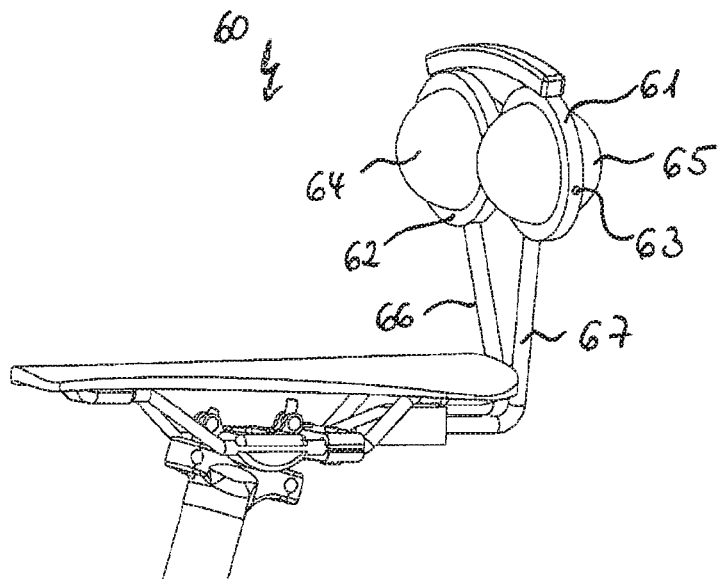
Figure 11:
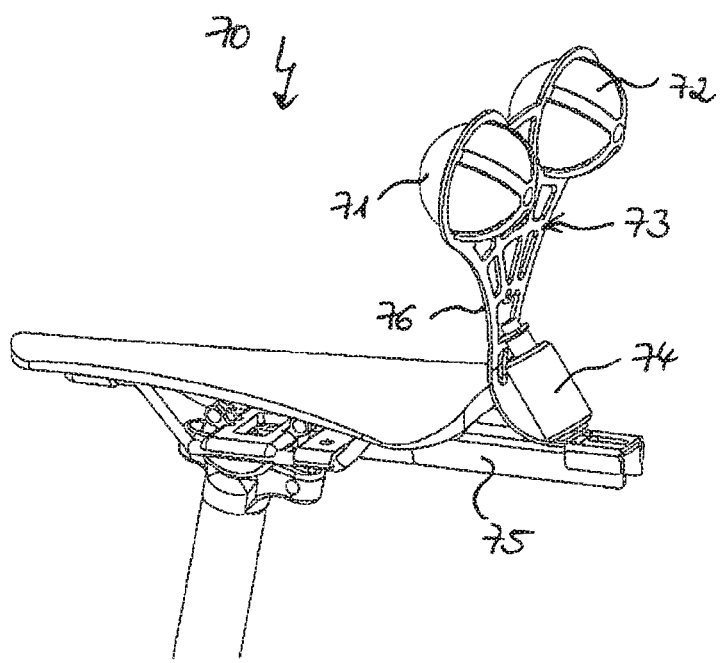

Advantageous embodiment variations are described in the drawing and will be explained in more detail below, in which FIG. 1 shows a view diagonally from behind onto a backrest comprising two spherical segment-shaped contact surfaces, FIG. 2 shows a lateral view of the backrest shown in FIG. 1, FIG. 3 shows a view from behind onto the backrest shown in FIGS. 1 and 2, FIG. 4 shows a lateral view of a saddle post fastening comprising saddle fastening, FIG. 5 shows a lateral view of a backrest comprising holder, FIG. 6 shows a view of a backrest comprising four spherical segment-shaped contact surfaces, FIG. 7 shows a view of a backrest comprising six spherical segment-shaped contact surfaces, FIG. 8 shows a backrest comprising four spheres, FIG. 9 shows a backrest comprising two rollers, FIG. 10 shows a backrest comprising horizontally mounted spheres, and FIG. 11 shows a backrest comprising a pressure cylinder.

The backrest 1 shown in FIG. 1 is attached to a device 2, which is driven by means of pedals, of which only the saddle post 3 and the saddle 4 are shown.

The backrest 1 has a holder 5 for fastening to the device 2 and a contact surface 6 for supporting a person (not shown) operating the device. This person operating the device sits on the saddle and the contact surface 6 is set in such a way that it abuts against the back of the person.

This contact surface 6 has a base body 7, to which two spheres 8 and 9 are fastened, which each have a spherical segment-shaped contact surface 10, 11. As shown in FIG. 2, the spheres 8 and 9 can be retained in a cage 12 or can be arranged therein so as to be rotatable relative to the cage.

The distance of the spheres 8 and 9 and thus also of the contact surfaces 10 and 11 relative to one another can be individually set by means of a screwed or latching mechanism 13, as shown in FIG. 3. In addition, the distance of the spheres 8 and 9 and thus of the contact surfaces 10 and 11 relative to the saddle 4 and relative to one another can also be set by means of the mechanism 13. The connection of the cage 12 to the upper lever arm 14 or the cage 12 itself can be formed in such a way that the contact surfaces 10 and 11, which are arranged on both sides of the holder 5, are elastically mounted relative to the base body 7. In addition, the contact surfaces 10 and 11 or the spheres 8 and 9 can be formed elastically. Together, several contact surfaces 10 and 11 can also be elastically mounted relative to the base body 7, for example by means of a flexible formation of the mechanism 13.

The base body 7 consists of an upper lever arm 14 and a lower lever arm 15, which are connected in a movable and fixable manner so as to be capable of being set via a joint 16.

The lower lever arm 15 is fastened to a saddle fastening means 17 in such a way that it can be pulled out of the saddle fastening means 17 to the rear and can be pushed into the saddle fastening means 17, in order to adjust the effective lever arm of the lower lever 15. For this purpose, the lower lever arm 15 can be fixed in its position by means of the catch 18.

The saddle fastening means 17 and the saddle post fastening means 19 are connected to one another via a lever 20, which is articulated to the saddle post fastening means 19 as well as to the saddle fastening means 17 by means of a joint 21 or 22, respectively.

FIG. 5 shows, how a bottle 23 is held in a holder 24 between the contact surfaces 10 and 11. This holder could also be formed to hold a box, as rack or for holding a rear light (not shown).

FIGS. 6 and 7 show that instead of two contact surfaces, which are arranged next to one another, several contact surfaces can also be arranged one on top of the other, in particular as square or rectangle. For instance, FIG. 6 shows contact surfaces 25, 26, 27, and 28, which are formed like the contact surfaces 10 and 11, and which can be individually shifted and positioned in square arrangement, but via the mechanisms 29 and 30.

The contact surfaces 31 to 36 shown in FIG. 7 can thus also be individually set and fixed by means of the mechanisms 37 to 39.

FIG. 8 shows spherical contact surfaces 40 to 43, which are mounted so as to be capable of rotating around the axes 44 and 45.

Instead of spheres, rollers 47 and 48 can also be arranged one on top of the other as shown in FIG. 9, which are preferably arranged so as to be capable of rotating around an axis 49 or 50, respectively, mounted on the base body 51.

FIG. 10 shows a special embodiment of a backrest 60 comprising spheres 64, 65, which are mounted in a respective ring 61, 62 around an essentially horizontal axis 63. Said spheres are held on two parallel rods 66, 67, which provide for a limited rotation around a vertical axis and for a limited pivoting around a horizontal axis.

While FIG. 10 shows an exemplary embodiment for a passive yielding of the backrest 60 by means of the design and the material selection of the base body, FIG. 11 shows an exemplary embodiment of a backrest 70 for an adjustment of the angular position of the contact surface of the two spheres 71 and 72 due to a deformation of the base body 73 by means of a pressure cylinder 74. In the exemplary embodiment, this pressure cylinder 74 is arranged between a lower lever arm 75 and an upper lever arm 76 in order to change the angle, at which the lever arms 75 and 76 are arranged relative to one another. The pressure cylinder can act passively as gas pressure spring or actively pneumatically or hydraulically according to a controller (not shown).

Pressure sensors (not shown) arranged in the spheres 71, 72 can absorb a contact pressure, which the user applies to the contact surfaces, and can transfer this pressure via a sender (not shown) to a receiver. However, the contact pressure can also be used to set the pressure on the pressure cylinder 74 in a regulated or controlled manner.

Depending on the field of application, this makes it possible to use individually formed and individually mounted and positioned contact surfaces, so as to use the backrest to absorb a pressure applied by the user of the device 2 driven by means of the pedals.

The invention claimed is:

1. A backrest for a device driven by pedals comprising a holder for fastening to the device; and
at least first and second contact surfaces spaced apart by a distance for supporting a person operating the device;
wherein each of the first and second contact surfaces has a surface of a sphere or a roller and is rotatably mounted on a support for movement around a horizontal axis at a central portion of each of the first and second contact surfaces; and
wherein the first and second contact surfaces are formed elastically.

2. The backrest according to claim 1, wherein the distance can be set so as to be capable of fixing the first and second contact surfaces relative to one another.

3. The backrest according to claim 1, wherein the first and second contact surfaces are arranged on both sides of the holder.

4. The backrest according to claim 1, wherein the support has at least two lever arms, which are connected to one another so as to be capable of being set via a joint.

5. The backrest according to claim 1, wherein the support has at least two lever arms and the length of at least one of the lever arms can be set.

6. The backrest according to claim 1, wherein the support has a saddle fastening means for fastening to a saddle.

7. The backrest according to claim 6, wherein the support has a saddle post fastening means for fastening to a saddle post.

8. The backrest according to claim 7, wherein a connecting rod is connected in an articulated manner to the saddle fastening means and the saddle post fastening means.

9. The backrest according to claim 1, further comprising third and fourth contact surfaces spaced apart by the distance for supporting the person operating the device, and a further holder between the first and second contact surfaces and between the third and fourth contact surfaces.

10. The backrest according to claim 1, further comprising a saddle cover and/or a bicycle lock.

11. The backrest according to claim 1, further comprising a bicycle light.

12. The backrest according to claim 1, further comprising a transmitter.

13. The backrest according to claim 1, further comprising a sensor and a pressure cylinder for changing the position of the first and second contact surfaces in order to thus vary the contact pressure of the first and second contact surfaces on the back of a user.

14. An assembly comprising a saddle and the backrest according to claim 1, wherein the backrest is arranged in an articulated manner relative to the saddle in order to form an essentially horizontal saddle extension.

15. A device comprising the assembly according to claim 14.

16. A backrest for a device driven by pedals comprising a holder for fastening to the device; and
at least first and second contact surfaces spaced apart by a distance for supporting a person operating the device;
wherein each of the first and second contact surfaces has a surface of a sphere or a roller and is rotatably mounted on a support for movement around a horizontal axis at a central portion of each of the first and second contact surfaces; and
wherein the first and second contact surfaces are mounted elastically relative to the support.

17. A backrest for a device driven by pedals comprising a holder for fastening to the device; and
at least first, second, third, and fourth contact surfaces spaced apart by a distance for supporting a person operating the device;
wherein each of the first, second, third, and fourth contact surfaces has a surface of a sphere or a roller and is rotatably mounted on a support for movement around a horizontal axis at a central portion of each of the first, second, third, and fourth contact surfaces; and
wherein the first, second, third, and fourth contact surfaces are elastically mounted relative to the support.

* * * * *